March 14, 1944.    T. M. EVANS    2,344,294
ELECTROMAGNETIC INDUCTION APPARATUS
Filed Dec. 18, 1940    2 Sheets-Sheet 1

Inventor:
Thomas M. Evans,
by Harry E. Dunham
His Attorney.

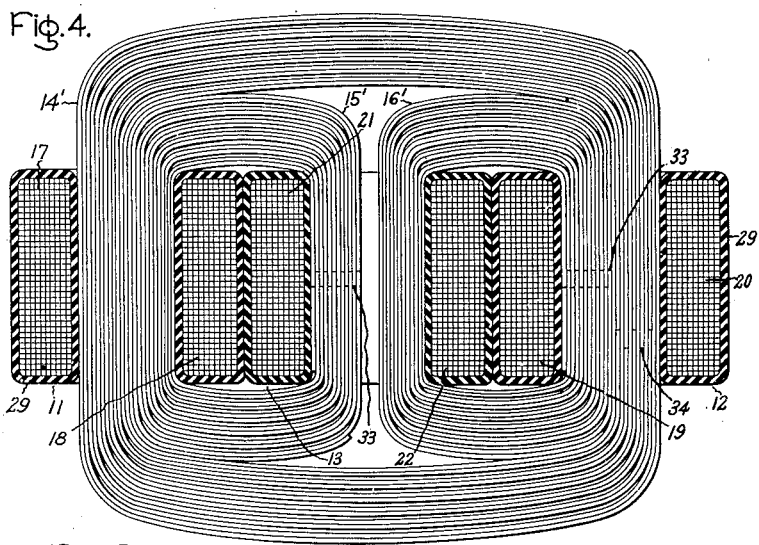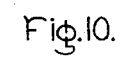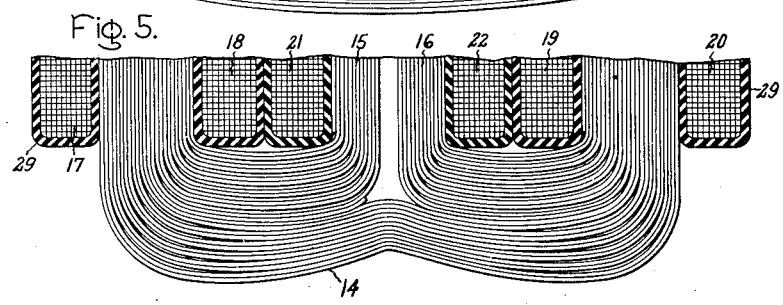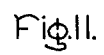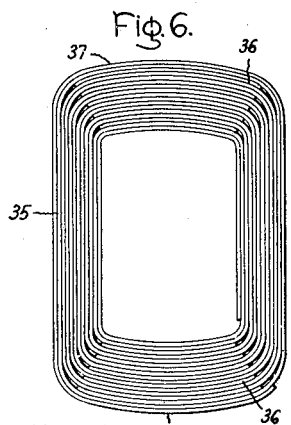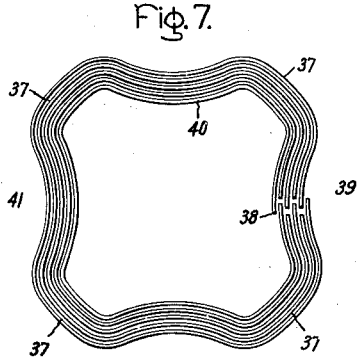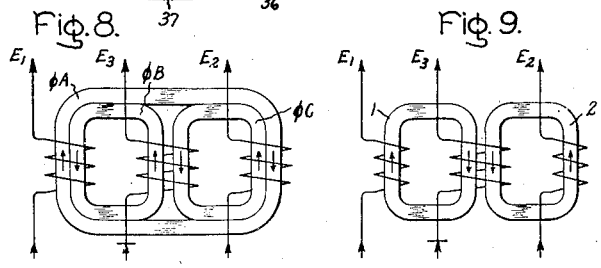

Patented Mar. 14, 1944

2,344,294

UNITED STATES PATENT OFFICE 2,344,294

ELECTROMAGNETIC INDUCTION APPARATUS

Thomas M. Evans, Pittsfield, Mass., assignor to General Electric Company, a corporation of New York Application December 18, 1940, Serial No. 370,691

8 Claims. (Cl. 175—356)

My invention relates to electro-magnetic induction apparatus and concerns particularly transformers and reactors having cores consisting of flat-wise, spirally wound or coiled strips of magnetic material.

It is an object of my invention to provide three-phase electro-magnetic induction apparatus having increased efficiency or having increased economy of material and reduced weight as compared with three separate single-phase transformers connected to a three-phase alternating current electric circuit, or as compared with a conventional three-phase transformer employing punched and stacked laminations. Other and further objects and advantages will become apparent as description proceeds.

In carrying out my invention in its preferred form, I employ three preformed, form-wound conductive winding structures, one for each of the phases of the electrical system; and three wound strip magnetic cores assembled with the winding structures after they have been fully insulated. The winding structures may be of the elongated or rectangular cross-section type for the sake of obtaining the desirable reactance and cooling properties of winding structures with such shaped cross-sections. The winding structures are placed side by side in a row with parallel winding legs and with parallel magnetic axes perpendicular to the winding legs. Each winding structure has a window between the winding legs for the reception of magnetic core material and has the sides of two different cores passing through it. Two of the cores each surround winding legs of two adjacent winding structures. The third core surrounds the other two cores. The edges of the strips of magnetic material forming all three of the cores lie within the same two bounding planes.

Figure 1:
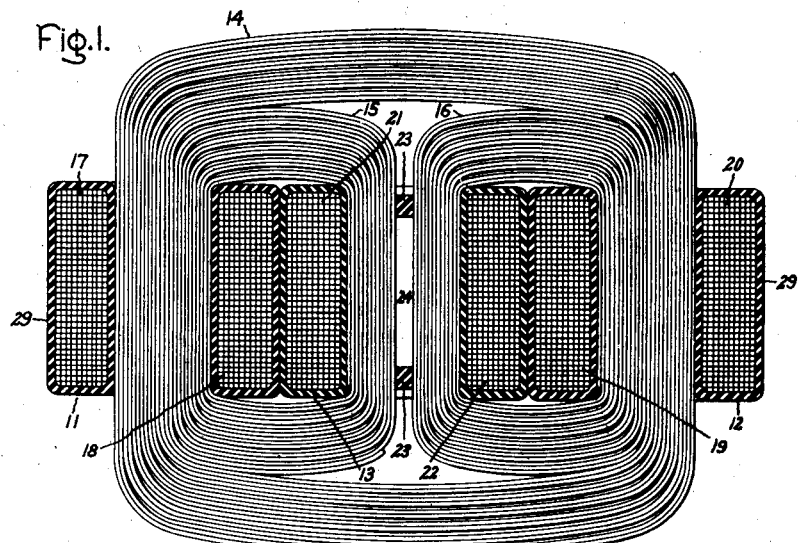
Figure 2:
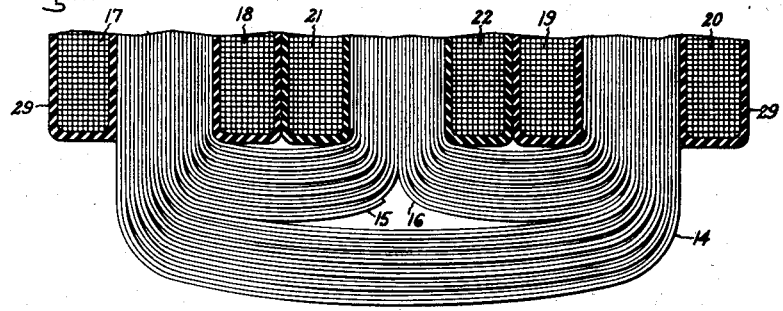
Figure 3:
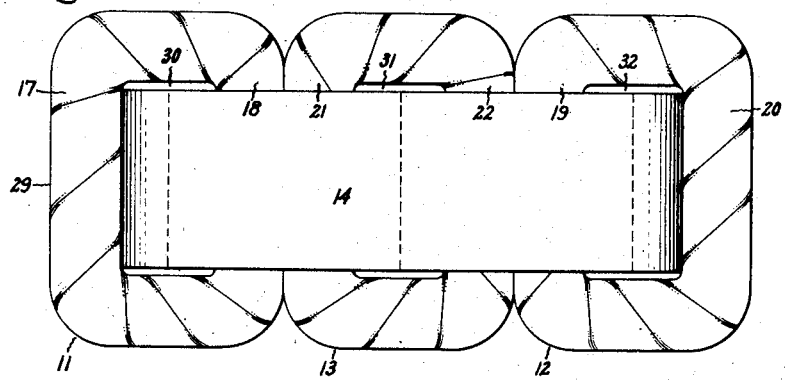

A better understanding of my invention will be afforded by the following detailed description considered in connection with the accompanying drawings and those features of the invention which I believe to be novel and patentable will be pointed out in the claims appended hereto. In the drawings, Fig. 1 is a view of one embodiment of my invention showing the winding structures in cross-section. Fig. 2 is a fragmentary view of a modification in the arrangement of Fig. 1. Fig. 3 is a side view of the arrangement of Figs. 1 and 2. Fig. 4 is a view corresponding to Fig. 1 showing another modification therein. Fig. 5 is a fragmentary view of a modification of the embodiments of Figs. 1 to 4 inclusive. Fig. 6 is a plan view of a coil of magnetic strip material illustrating a stage in the process of producing the cores. Fig. 7 is a view to smaller scale of the magnetic strip material unwound from the coil of Fig. 6 in a step of the process of applying the magnetic strip material to the winding structures. Fig. 8 is a schematic diagram illustrating the electro-magnetic arrangement of Figs. 1 to 5. Fig. 9 is a schematic diagram of a modified arrangement employing only two cores for three-phase system instead of three cores. Fig. 10 is a vector diagram explaining the principle of operation of the arrangement of Figs. 1 to 5 and 8. Fig. 11 is a vector diagram explaining the principle of operation of the arrangement of Fig. 9. Like reference characters are utilized throughout the drawings to designate like parts.

The principal use of my invention at present is in connection with transformers, and for convenient I shall frequently make reference in the description to the apparatus as a transformer but it will be understood that my invention is not limited thereto and is applicable to reactors; both transformers and reactors being electro-magnetic induction apparatus having interlinked circuits carrying magnetic flux and electrical current respectively. In the form of my invention illustrated in Figs. 1 to 5 and 8, there are three electrically conductive winding structures 11, 12, and 13 interlinked by three wound-strip magnetic cores 14, 15 and 16. The winding structures 11, 12 and 13 have pairs of straight winding legs 17 and 18, 19 and 20, and 21 and 22 (see Fig. 3). The cross-sections of the winding legs are rectangular and straight sided in order that the winding structures may be fitted close together and occupy the core openings with high space factor (see Fig. 1). The cross-sections of the winding legs are elongated for the sake of the favorable reactance and cooling characteristics of elongated cross-section electrical windings already known to those skilled in the art.

The winding structures are shown as preformed fully insulated structures, each with overall wrappings 29 of protective and insulating tape. It will be understood, however, that in case of transformers, each of the winding structures 11, 12, and 13 will consist of a multiplicity of windings, such as primary and secondary windings, and in some cases tertiary and other auxiliary windings. But for the sake of eliminating unnecessary detail from the drawings, primary and secondary windings and their individual layers of insulation are not separately illustrated. The windings are placed side by side in a row with the winding structures 11 and 12 at either end and the winding structure 13 in the middle, adjacent winding legs being in close contact. The winding structures have openings or windows 30, 31, and 32, respectively, which receive the magnetic core material. It will be observed that the winding legs are parallel lying along the same plane, and that the magnetic axes of the windings, i. e., the center lines of magnetic fields passing through the winding windows are also parallel to each other and are perpendicular to the winding legs.

Cores of the wound-strip elongated rectangular opening type are disclosed and are described in greater detail in the application of Jacob J. Vienneau, Serial No. 318,868, filed February 14, 1940, "Electromagnetic induction apparatus and method of making the same," assigned to the same assignee as the present application and which application issued on December 22, 1942, as Patent 2,305,649 and as a divisional thereof, Patent 2,305,650. Each core consists of magnetic strip material, spirally wound flatwise with each layer of strip material lying in close surface contact with the adjacent layers of the same core within the winding windows. For convenience in core assembly, there may be cuts or breaks in the strip material every few turns as shown at 33 and 34 in Fig. 4. The adjacent winding legs 18 and 21, respectively, of the end winding structure 11 and the middle winding structure 13 are surrounded and closely embraced by the core 15. In a similar manner, the core 16 surrounds and closely embraces the adjacent winding legs 19 and 22 of the winding structures 12 and 13. The core 14 is similar in type of construction to the cores 15 and 16. It surrounds the cores 15 and 16, and the inner layer of strip material in the core 14 closely embraces the outer turns of the cores 15 and 16. As seen in Fig. 3, the three cores have their strip edges in the same two bounding planes. The cores 14 and 15 pass through the winding window 30 of the winding structure 11, the cores 15 and 16 pass through the winding window 31 of the winding structure 13, and the cores 14 and 16 pass through the winding window of 32 of the winding structure 12. Spacing and securing blocks or wedges 23 may, if desired, be provided in the space 24, which may serve as a cooling duct.

The connections from the winding structures 11, 12, and 13 are brought out in the same way, as indicated in Fig. 8, and they are connected to the three phases of a three-phase electrical system in the usual manner. It will be understood that in Fig. 8, for simplicity, only one winding is shown for each winding structure, but in case of the transformers there will be duplicate sets of windings with the primary winding in each winding structure connected to the primary network or three-phase alternating current source and the secondary winding in each winding structure connected to the secondary network or three-phase load circuit.

My construction results in a saving in core material. The economy in amount of the core material effected by my invention may be considered as resulting from a greatly-reduced length of magnetic circuit per phase, as the portions of the magnetic core adjacent to the end winding phases act as return circuits to those adjacent to the middle winding phase, although with a small loss in economy due to a slightly-increased cross section arising from a phase difference between the fluxes of the core parts 14 and 15. Alternatively, the economy may be considered also as resulting from the fact that each completely closed core encloses two windings, though from this point of view with a small loss in economy due to an increased length of magnetic circuit, if the complete magnetic circuit is to be considered as that of one winding phase. I have found by a comparison of my three-phase design with corresponding three single-phase units of wound-core type that the total core weight may be reduced in some cases by as much as 20 per cent.

It will be understood that the saving may be taken in either reduction of weight and cost of material or in increase of electrical efficiency, and the saving may also be distributed between the copper and iron circuits. Basing a comparison on an effort to obtain substantially the same magnetic losses in either the construction shown in Figs. 1 and 3 or in a three-phase transformer with stacked punchings forming the core, I have found that for a 5-kva. unit, by utilizing my construction, the total losses may be reduced over twelve percent; the impedance may be reduced about 45%; the weight of iron may be reduced over 30%; with reductions also in the weight of copper and in the volume of insulating oil as well as in the floor space occupied by the tank containing the oil and the transformer. My construction permits, also, the use of round tanks instead of oval.

Assuming that there would be no transference of flux between the separate cores, the magnitudes and phase relationships, the fluxes would be represented by the vector diagram, Fig. 10, in which the fluxes $\phi_1$, $\phi_2$, and $\phi_3$ are the fluxes required to induce the line voltages $E_1$, $E_2$, $E_3$ in phases 1, 2, 3, respectively, of the electrical system; and fluxes $\phi_A$, $\phi_B$, $\phi_C$ are the fluxes which would flow in the separate cores 14, 15 and 16. Magnitude and phase relations of the fluxes $\phi_1$, $\phi_2$ and $\phi_3$ are fixed by the assumed radial symmetry of the applied voltages. All three of the winding structures are connected in like manner to the phases in the system so that the flux at any instant in any core flows in opposite directions in the two windings which it links as represented by the arrows in Fig. 8. The fluxes $\phi_1$, $\phi_2$, $\phi_3$ are the vector differences, accordingly, between the fluxes in the cores. $\phi_1$ is the vector difference between $\phi_B$ and $\phi_A$. As shown by the vector diagram, the resultant flux $\phi_1$ is displaced 30° from either of the component fluxes $\phi_A$ and $\phi_B$. Similar displacements exist in the case of other fluxes. Since the secant of 30° is 1.15, the theoretical difference in phase between the fluxes acting in any given electrical winding would result in a need of 15% greater flux in each core than would be required if the core fluxes were in phase. I have found, however, that there is a certain amount of crossing of flux between the inner and outer cores so that the excess flux required to produce the requisite resultant flux is only about 8%. The excess flux required may be reduced even further if desired by increasing the facility with which the flux may cross from one core to the other. This may be done by bringing the inner cores close together as shown in Fig. 2 or by increasing the length of contact of the inner and outer cores as shown in Fig. 5.

The foregoing theoretical analysis disregards the presence of any harmonics of the fundamental in the flux wave. When these are considered, I believe the characteristics of the combined core are substantially as though no extra flux were required to make up for the phase displacement of fundamental components of fluxes $\phi_A$, $\phi_B$ or $\phi_C$ in the two individual cores linking a given electrical winding. This is the case even without resorting to the bent-in construction represented by Fig. 5. It may be explained I believe by a reduction in the crest of the flux density wave within any individual core produced by third harmonic flux of opposite phase occasioned by the arrangement of the cores. It will be understood that, although a sine wave voltage would require a sine wave resultant flux linking an electrical winding, the fluxes in the individual cores are not necessarily sine wave.

In the arrangements illustrated the winding structures have substantially rectangular winding windows 30, 31 and 32 and accordingly the cores are arranged to give rectangular core sections in the winding windows with the edges of the core strip material in two bounding planes. In the case of larger transformers having winding structures with circular or other non-rectangular winding windows, the best space factor is obtained with core sections having cruciform or stepped-outline shape as in Fig. 15 of the aforesaid Vienneau application, or the individual core parts shown in Patent 2,199,116, Sanders, or the application of Matthew O. Troy, Serial No. 275,625, filed May 25, 1939, assigned to the same assignee as the present application, which issued on March 30, 1943, as Patent 2,314,912, where strips of different widths are used to build up the cores. Manifestly, my invention is not limited to the specific arrangement illustrated and does not exclude the use of stepped-outline core sections within the winding windows.

Since the outer core 14 has a greater perimeter than either of the inner cores 15 and 16, its reluctance would be greater if constructed in the same manner. This will not affect the magnitudes of the fluxes since these are determined by the applied voltages. However, it tends to make the magnetizing current of the third phase represented by the winding 13, slightly different from the magnetizing current of the first two phases. The reluctances of the three cores may be substantially equalized if desired by modifying the core construction as represented by cores 14′, 15′ and 16′ in Fig. 4. In this case the inside cores 15′ and 16′ are constructed with twice as many breaks or cuts 33 as the corresponding cuts 34 in the outer core 14′. For example, the inner cores 15′ and 16′ may have the cuts 33 in every turn of strip, whereas the outer core 14′ has the cuts 34 in every other turn of strip. The nature of these cuts and the manner of producing them will be described in more detail in connection with the method of assembling the apparatus.

In order to produce the most efficient and economical magnetic induction apparatus, it is necessary not only to employ magnetic core material which is adapted to operate with good magnetic properties, but it is also necessary to give the material suitable treatment to bring out the properties and to handle it in such a manner as to preserve the desirable magnetic properties. Magnetic core material which has been found to be satisfactory is high reduction cold rolled 3% silicon steel strip. To bring out the desirable magnetic properties this material must be subjected to heat treatment. After heat treatment it is necessary to avoid straining the material beyond the elastic limit. It is also necessary to avoid the retention of elastic strains, i. e., strains below the elastic limit. Furthermore, to eliminate eddy current losses, adhesion between turns of strip must be avoided.

The magnetic core, free from deleterious strains, is produced by winding the strip material into a coil of the exact size and shape which the strip is to have in the finished core and then subjecting it to heat treatment to bring out the desirable magnetic properties and to give it a permanent set whereby it will remain strain-free in the finished form when applied to the winding structure. In order that form-wound, fully preformed, and preinsulated winding structures may be employed, it is necessary to apply the magnetic strip material to the winding structures. This is done by unwinding the heat-treated, strain-free coils of strip and rewinding them around the winding legs of the winging structures. This unwinding and rewinding process also eliminates the adhesion between turns of strip. The method of unwinding and rewinding must be such, however, as to prevent subjecting the strip material to excessive strains at any time, and must also be such as to leave the turns of strip in the same sequence as in the heat-treated coil in order that each turn of strip will have the same size and shape as when heat-treated.

A method of applying wound-strip magnetic cores having elongated or non-circular openings therein to preformed conductive winding structures is more fully described in the aforesaid Vienneau patent. Briefly this consists of winding the strip material into a coil of the same size and shape as the finished core as illustrated in Fig. 6, for example. In order to avoid binding when the strip material is unwound and rewound about the winding legs, shims 36 are interposed between layers of strip at the ends 37 of the coil 35. Shims 36 having approximately the same thickness as the strip material of which the coil 35 is wound may be placed every two turns with satisfactory results. The coil of strip 35 as illustrated in Fig. 6, with the shims 36 in place, is subjected to suitable heat treatment in a furnace. After the strip has been removed from the furnace and cooled sufficiently, it is unwound from the coil 35 into a larger loop.

The size of the larger loop is so chosen that each turn of the larger loop constitutes an even number of aliquot fractions of a turn of the original coil of strip 35. For example, in the case of a coil of strip having the shape of coil 35, Fig 6; the larger loop might have a perimeter twice, two and one-half times as great, three times as great, etc. The resultant shape of the larger loop formed by unwinding a coil of strip such as the coil 35 into a form in which each turn of the larger loop represents two turns of the original coil of strip is illustrated in Fig. 7, in which the four portions 37 correspond to the two ends 37 of coil 35, Fig. 6. By arranging the successive turns of the larger loop in such a manner that the portions of corresponding radius of curvature are adjacent, excessive strains can be eliminated.

The strip material, as it is unwound from the original coil of strip 35 into the larger loop of the type represented in Fig. 7, may simultaneously be passed through the winding windows of two adjacent conductive winding structures. The larger loop is thereupon collapsed upon the winding legs beginning with the inside turns and continuing toward the outside until all of the turns of the larger loop have been collapsed to their shape in the original coil of strip. Where the strip material is to be applied to a plurality of winding structures, however, as in the apparatus of the present application, it will usually be found more convenient to unwind the coil of strip 35 into an independent larger loop (Fig. 7) and to cut out successive turns of the larger loop of Fig. 7 for application to the winding legs, as described more fully in the aforesaid Vienneau patent, particularly in connection with Figs. 12 and 13 thereof. It will be understood, of course, that the shims 36 drop out when the larger loop is formed. Referring to Fig. 7, staggered cuts 38 may be made at one side 39 of the larger loop in successive inner turns before each inner turn 40 is removed for application to the conductive winding structure. The finished core will then have a cut every two turns, since in the larger loop illustrated in Fig. 7, each turn has twice the perimeter of the individual turns in Fig. 6. The cuts are preferably staggered to minimize reluctance. Such a two-turn section of the core may readily be applied to the conductive winding structure manually. It will be understood that care is to be taken that turns are built up in the same sequence as they had in the original coil of strip 35. It will also be understood that the inner cores 15 and 16 are built up first and that thereafter the outer core 14 is applied.

In building up the core structures, illustrated in Fig. 4, in which the inner cores 15' and 16' have twice as many breaks or cuts as the outside core 14', the larger loop of Fig. 7 may have cuts made in the inside turns at both sides 39 and 41, as the inner layers of strip are removed for application to the winding legs to form the smaller cores 15' and 16'. Then when the larger core 14' is built up, the cuts would be made at only one side of the larger or double perimeter loop.

Alternatively, cuts might be made at only one side of the larger loop for both inner and outer cores; but the larger loop employed in connection with the assembly of the outside core 14' might be made up with four times the perimeter instead of twice the perimeter of the original heat-treated coil of strip. In that case, the inside cores 15' and 16' would have breaks every two turns and the outside core 14' would have breaks every four turns, instead of having breaks every turn and every two turns respectively, as illustrated in Fig. 4.

It will be evident that for assembling the cores 15' and 16', as illustrated in Fig. 4, with a cut every turn, it would not be necessary to form any larger loop if care were taken to reassemble the turns of strip in the proper order. For example, the turns of strip could be cut off one at a time from the original coil of strip 35 beginning at the outside, and when the inside turn had been reached it could be applied to the winding leg manually, whereupon each surrounding layer or turn of strip would be applied until the structure of cores 15' and 16' had been built up. The original coil of strip illustrated in Fig. 6 corresponds to the finished cores 15 and 16 or 15' and 16'. For forming the outside cores 14 and 14', a larger original coil of strip of different shape would have to be wound upon a mandrel of the proper size and shape. In each embodiment of my invention great mechanical strength and rigidity are provided because the iron cores and copper coils bind each other together to form a self-supporting unit.

Although I have described and illustrated an arrangement for three-phase alternating current electrical systems in which three magnetic cores are assembled to three electrically conductive winding structures, it will be understood that my invention is not limited to three-phase polyphase systems nor to polyphase systems in which three magnetic cores are employed. For example, for some applications three-phase electromagnetic induction apparatus may be constructed with two wound-strip magnetic cores as shown diagrammatically in Fig. 9. In this case the windings of phases 1 and 2 are linked only by magnetic cores 1 and 2, respectively. Accordingly, cores 1 and 2 must carry fluxes $\phi_1$ and $\phi_2$ displaced in phase 120°, as represented in Fig. 11, in order to induce the phase voltages $E_1$ and $E_2$ which are 120° apart. The flux linking the third-phase winding and inducing the third voltage $E_3$, must be 120° displaced in phase from fluxes $\phi_1$ and $\phi_2$. It will be observed, however, that the vector sum of the fluxes $\phi_1$ and $\phi_2$ is a vector, represented in Fig. 11 by minus $\phi_3$, which is equal in length and displaced 60° from $\phi_1$ and $\phi_2$. The flux $\phi_3$ is, of course, 180° out of phase with the flux minus $\phi_3$ require to induce the third phase voltage $E_3$. Since, as indicated in Fig. 9 by the arrows, the fluxes flowing at the sides of the cores 1 and 2, linking the third inductive winding act in the opposite direction with respect to the first and second windings, the proper relationships between induced voltages are obtained by connecting the three windings in the same manner with respect to the three-phase system, just as was done in the arrangement of Fig. 8. The economy of material, however, is not as great as the arrangement in Fig. 8, for the reason that the resultant of the fluxes $\phi_1$ and $\phi_2$ is displaced 60° from the component fluxes, instead of only 30° as in the arrangement as represented by Figs. 8 and 10. The arrangement of Fig. 9 may be preferred, however, in cases where a low zero phase sequence reactance is desired, whereas the arrangement of Fig. 8 is preferred where a high zero phase sequence reactance is desired.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. Three-phase electromagnetic induction apparatus comprising three conductive-winding structures, each adapted to be connected to one of the phases of a three-phase electrical system, and three magnetic cores formed of a plurality of flatwise curved strips forming substantially strain-free cores of magnetic material providing continuous magnetic paths at the corners of the cores so that the flux need not cross butt joints of high reluctance at the corners, said winding structures being side by side in a row with parallel winding legs and with parallel magnetic axes perpendicular to the winding legs, each winding structure having a window for the reception of magnetic core material, the winding legs having elongated and substantially flat-sided cross-sections, one of said cores surrounding a winding leg of one of the end winding structures together with the adjacent winding leg of the middle winding structure, a second of said cores surrounding a winding leg of the other of said end winding structures together with the adjacent leg of the middle winding structure, and the third of said cores surrounding the other two cores, each winding window having two cores passing therethrough, said magnetic cores having a reduction in the crest of the flux density wave due to the presence of third harmonic flux components during operation of the apparatus.

2. Polyphase electromagnetic induction apparatus comprising a plurality of conductive-winding structures, each adapted to be connected to one of the phases of a polyphase electrical system and a plurality of wound-strip magnetic cores equal in number to the number of conductive winding structures, said winding structures being side by side in a row with parallel winding legs and with parallel magnetic axes perpendicular to the winding legs, each winding structure having a window for the reception of magnetic core material, each leg having a substantially flat-sided cross-section, one of said cores surrounding a winding leg of one of the end winding structures together with the adjacent winding leg of the adjacent winding structure, the second of said cores surrounding a second winding leg of the second of said winding structures together with the adjacent leg of an adjacent third winding structure, each of said magnetic cores with the exception of one of them, referred to as the last magnetic core, thus surrounding a pair of winding legs of adjacent conductive winding structures and said last magnetic core surrounding the other magnetic cores, each winding window having two cores passing therethrough.

3. Three-phase electromagnetic induction apparatus comprising three conductive-winding structures, each adapted to be connected to one of the phases of a three-phase electrical system, and three wound-strip magnetic cores, each winding structure having a window for the reception of magnetic core material, one of said cores surrounding a winding leg of one of the winding structures together with a winding leg of a second winding structure placed adjacent to the first, the second of said cores surrounding a second winding leg of the second winding structure together with a winding leg of a third winding structure placed adjacent to the second, a third of said cores passing through the winding windows of the first and third conductive winding structures, each winding window of the three winding structures having two cores passing therethrough.

4. Polyphase electromagnetic induction apparatus comprising a plurality of conductive-winding structures, each adapted to be connected to one of the phases of a polyphase electrical system and a plurality of wound-strip magnetic cores equal in number to the number of conductive winding structures, said winding structures being side by side, each winding structure having a window for the reception of magnetic core material, the first of said cores surrounding a winding leg of one of the end winding structures together with the adjacent winding leg of the second winding structure placed adjacent to the first, a second of said cores surrounding a second winding leg of said second winding structure together with an adjacent winding leg of a third winding structure placed adjacent to the second, each of said magnetic cores with the exception of one referred to as the last magnetic core, thus surrounding winding legs of two adjacent winding structures and the said last magnetic core surrounding all the other magnetic cores, each winding window having two cores passing therethrough.

5. Three-phase electromagnetic induction apparatus comprising three conductive-winding structures, each adapted to be connected to one of the phases of a three-phase electrical system and three wound-strip magnetic cores, said winding structures being side by side in a row, each winding structure having a window for the reception of magnetic core material, said magnetic cores being made up of magnetic strip material spirally wound flatwise with the adjacent layers of strip in close surface contact along the sides of the cores adapted to pass through winding windows, one of said cores surrounding the winding leg of one of the end winding structures together with the adjacent leg of the middle winding structure, the second of said cores surrounding a winding leg of the other of the end winding structures together with the adjacent leg of the middle winding structure and the third of said cores surrounding the other two cores, each winding window having two cores passing therethrough, the strip material in said magnetic cores being mechanically discontinuous by reason of breaks or cuts in the strip at predetermined intervals in terms of the number of layers of strip, said third core having fewer breaks than said first or second cores, whereby the effect of increased peripheral length of the third core on its magnetic reluctance is compensated to minimize disparity of reluctance of the three cores and disparity of the magnetizing currents of the winding structures.

6. Polyphase electromagnetic induction apparatus comprising a plurality of winding structures, each adapted to be connected to one of the phases of a polyphase electrical system and a plurality of wound-strip magnetic cores equal in number to the number of conductive winding structures, said winding structures being side by side in a row with parallel winding legs and with parallel magnetic axes perpendicular to the winding legs, each winding structure having a window for the reception of magnetic core material, one of said cores surrounding the winding leg of one of the end winding structures together with the adjacent winding leg of an adjacent second winding structure, the second of said cores surrounding the second winding leg of the second of said winding structures together with the adjacent winding leg of the adjacent third winding structure, each of the magnetic cores with the exception of one, referred to as the last magnetic core, thus surrounding adjacent winding legs of two adjacent winding structures, said last core surrounding all the other cores, each winding window having two cores passing therethrough, said last core being bent in at the sides to conform closely in shape to the outer surfaces of the surrounded cores, whereby interchange of flux between magnetic cores is facilitated.

7. Polyphase electromagnetic induction apparatus comprising a plurality of conductive winding structures, each adapted to be connected to one of the phases of polyphase electrical system and a plurality of wound-strip magnetic cores equal in number to the number of conductive winding structures, said winding structures being side by side in a row with parallel winding legs and with parallel magnetic axes perpendicular to the winding legs, each winding structure having a window for the reception of magnetic core material, each leg having a substantially flat-sided cross-section, one of said cores surrounding a winding leg of one of the end winding structures together with the adjacent winding leg of the adjacent second winding structure, the second of said cores surrounding a second winding leg of the second winding structure together with the adjacent leg of an adjacent third winding structure, each of said magnetic cores with the exception of one of them, referred to as the last magnetic core, thus surrounding a pair of winding legs of adjacent conductive winding structures and said last magnetic core surrounding the other magnetic cores, each winding window having two cores passing therethrough, said magnetic cores other than said last core being spaced from each other to minimize transference of magnetic flux therebetween.

8. Polyphase electromagnetic induction apparatus comprising a plurality of conductive winding structures, each adapted to be connected to one of the phases of a polyphase electrical system and a plurality of wound-strip magnetic cores equal in number to the number of conductive winding structures, said winding structures being side by side in a row with parallel winding legs and with parallel magnetic axes perpendicular to the winding legs, each winding structure having a window for the reception of magnetic core material, each leg having a substantially flat-sided cross-section, one of said cores surrounding a winding leg of one of the end winding structures together with the adjacent winding leg of the adjacent second winding structure, the second of said cores surrounding a second winding leg of said second winding structure together with the adjacent leg of the adjacent third winding structure, each of said magnetic cores with the exception of one of them, referred to as the last magnetic core, thus surrounding a pair of winding legs of adjacent conductive winding structures and said last magnetic core surrounding the other magnetic cores, each winding window having two cores passing therethrough, said last magnetic core binding the other magnetic cores closely together to form a unitary self-supporting structure and facilitate interchange of flux between cores for minimizing phase displacement between fluxes linking the same winding structure.

THOMAS M. EVANS.